United States Patent
Tsai et al.

[11] Patent Number: 5,995,231
[45] Date of Patent: Nov. 30, 1999

[54] METHOD FOR CALIBRATING A LIGHT TRAVELING DISTANCE IN A SCANNING MODULE

[75] Inventors: Jern-Tsair Tsai, Taipei Hsien; Bill Chen, Ping-Tung; Te-Chih Chang, Hsin-Chu, all of Taiwan

[73] Assignee: Mustek Systems Inc., Hsinchu, Taiwan

[21] Appl. No.: 09/187,196

[22] Filed: Nov. 3, 1998

[51] Int. Cl.⁶ .................................................. G01B 11/02
[52] U.S. Cl. .......................... 356/388; 356/383; 356/386; 356/445
[58] Field of Search .................................. 356/388, 383, 356/386, 445

[56] References Cited

U.S. PATENT DOCUMENTS 5,242,567  9/1993  Fujimiya et al. ....................... 356/344
5,323,219  6/1994  Hamanaka et al. ..................... 399/371

Primary Examiner—Frank G. Font
Assistant Examiner—Reginald A. Ratcliff
Attorney, Agent, or Firm—Winston Hsu

[57] ABSTRACT

The present invention provides a method for altering the light traveling distance in an optical scanning module using transparent glass. The optical scanning module comprises a transparent glass module that refracts light to alter the traveling distance of the light as it passes from the document to the optical sensing device. The proper thickness of this transparent glass module is specifically chosen to correctly calibrate the error of the traveling distance of the light created during the manufacturing of the scanner.

10 Claims, 3 Drawing Sheets

METHOD FOR CALIBRATING A LIGHT TRAVELING DISTANCE IN A SCANNING MODULE

BACKGROUND OF THE INVENTION

1. Field of the Invention

The present invention relates to a method for calibrating a light traveling distance in a scanning module and, more particularly, to a method using transparent glass to increase or decrease the light traveling distance in a scanning module.

2. Description of the Prior Art

Platform scanners are commonly used in offices for converting paper documents into image data. The optical scanning module is the main scanning component within a platform scanner. A scanning module usually comprises a casing having an opening for receiving light transmitted from a scanned document, an optical sensing device installed in the casing for transforming the light transmitted from the scanned document into corresponding image signals, a plurality of mirrors for passing the light to the optical sensing device, and a lens for converging the light to the optical sensing device.

The resolution of a typical scanning module is constant and determined by the magnifying power of the scanning module as well as the resolution of the optical sensing device in the scanning module. The magnifying power of the scanning module is determined by the lens, by the distance from the scanned document to the lens, and by the distance from the lens to the optical sensing device. Therefore, if errors occur in the positioning or the angles of the lens or mirrors during the assembly process, the distance between the scanned document and the lens or the distance between the lens and the optical sensing device is altered thus biasing the magnifying power of the scanning module. Also, components in the scanning module such as the lens and optical sensing device have their own tolerances which may also affect the resolution of the scanning module.

When reduction of the allowable error tolerance range of the magnifying power, lens or the optical sensing device is required, the yield rate of scanners drops sharply and the number of calibrations increase dramatically. Thus the cost of the product increases.

SUMMARY OF THE INVENTION

It is therefore a primary objective of the present invention to provide a method for calibrating the light traveling distance in a scanning module using transparent glass.

In a preferred embodiment, the present invention provide a method for calibrating the light traveling distance in a scanning module, the scanning module comprising:

- a casing having an opening for receiving light transmitted from a scanned document;
- an optical sensing device installed in the casing for transforming the light transmitted from the document into corresponding image signals;
- a plurality of mirrors for passing the light to the optical sensing device;
- a lens for converging the light transmitted from the document onto the optical sensing device;
- a transparent glass module of varying thickness installed between the mirrors and the lens for altering the distance traveled by the light from the document to the optical sensing device; and
- a locking device for fixing the transparent glass module.

The method for calibrating the light traveling distance in the scanning module comprises the following steps:

- measuring the light traveling distance from the document to the optical sensing device and comparing it with a standard light traveling distance to obtain a difference;
- determining the thickness of a transparent glass module according to the difference of the light traveling distance;
- fixing the transparent glass module of the determined thickness in the optical track between the document and the lens to calibrate the light traveling distance.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
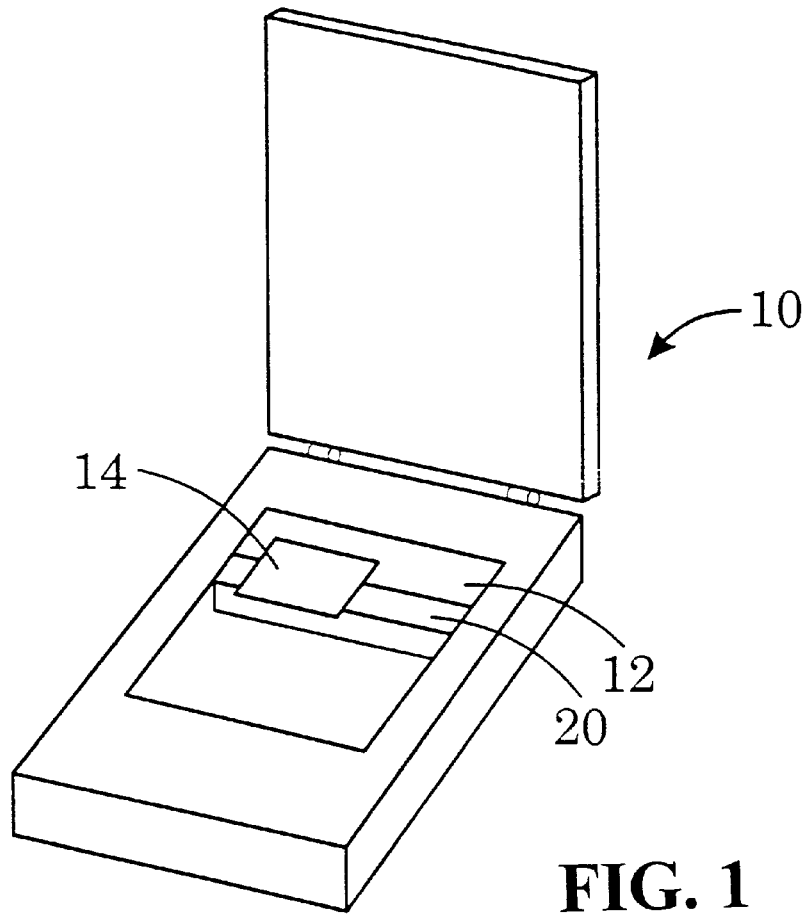
FIG. 1 is a perspective diagram of a scanner according to the present invention.
Figure 2:
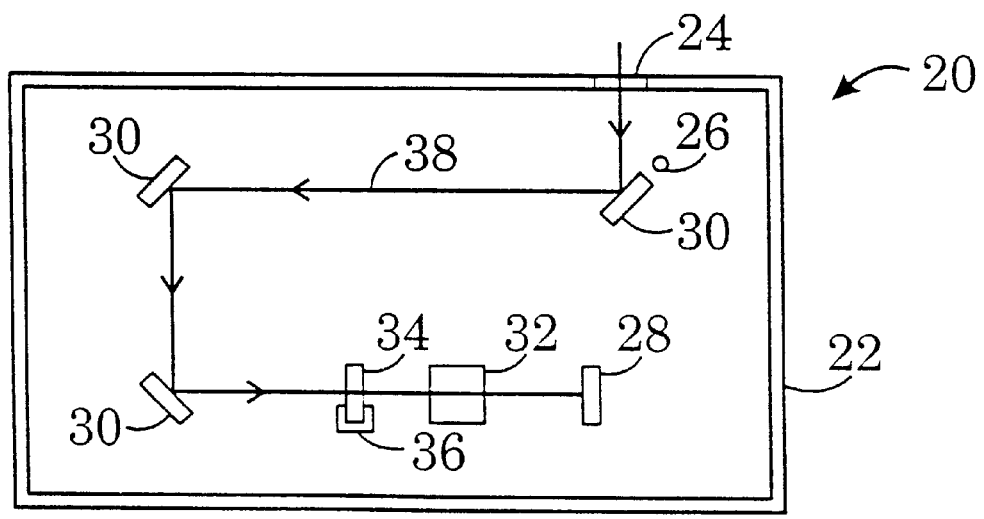
FIG. 2 is a schematic diagram of the optical scanning module of the scanner shown in FIG. 1.

Please refer to FIG. 1 and FIG. 2. FIG. 1 is a perspective diagram of a scanner 10 according to the present invention. FIG. 2 is a schematic diagram of the scanning module 20 of the scanner 10 shown in FIG. 1. The scanner 10 comprises a transparent opening 12 for placing a scanned document 14, and a scanning module 20 movably installed in the scanner 10 for scanning the document 14.

The scanning module 20 comprises a casing 20 having an opening 24 for receiving light transmitted from the document 14, a light source 26 installed in the casing 22 for illuminating the document 14, an optical sensing device 28 for transforming the light transmitted from the document 14 into corresponding image signals, a mirror module 30 for passing the light transmitted from the document 14 to the optical sensing device 28, a lens installed between the mirror module 30 and the optical sensing device 28 for converging the light to the optical sensing device 28, a transparent glass installed between the mirror module 30 and the lens 32 for modifying the traveling distance 32 of the light transmitted from the document 14 to the lens 32, and a locking device 36 for immobilizing the transparent glass 34.

Figure 3:
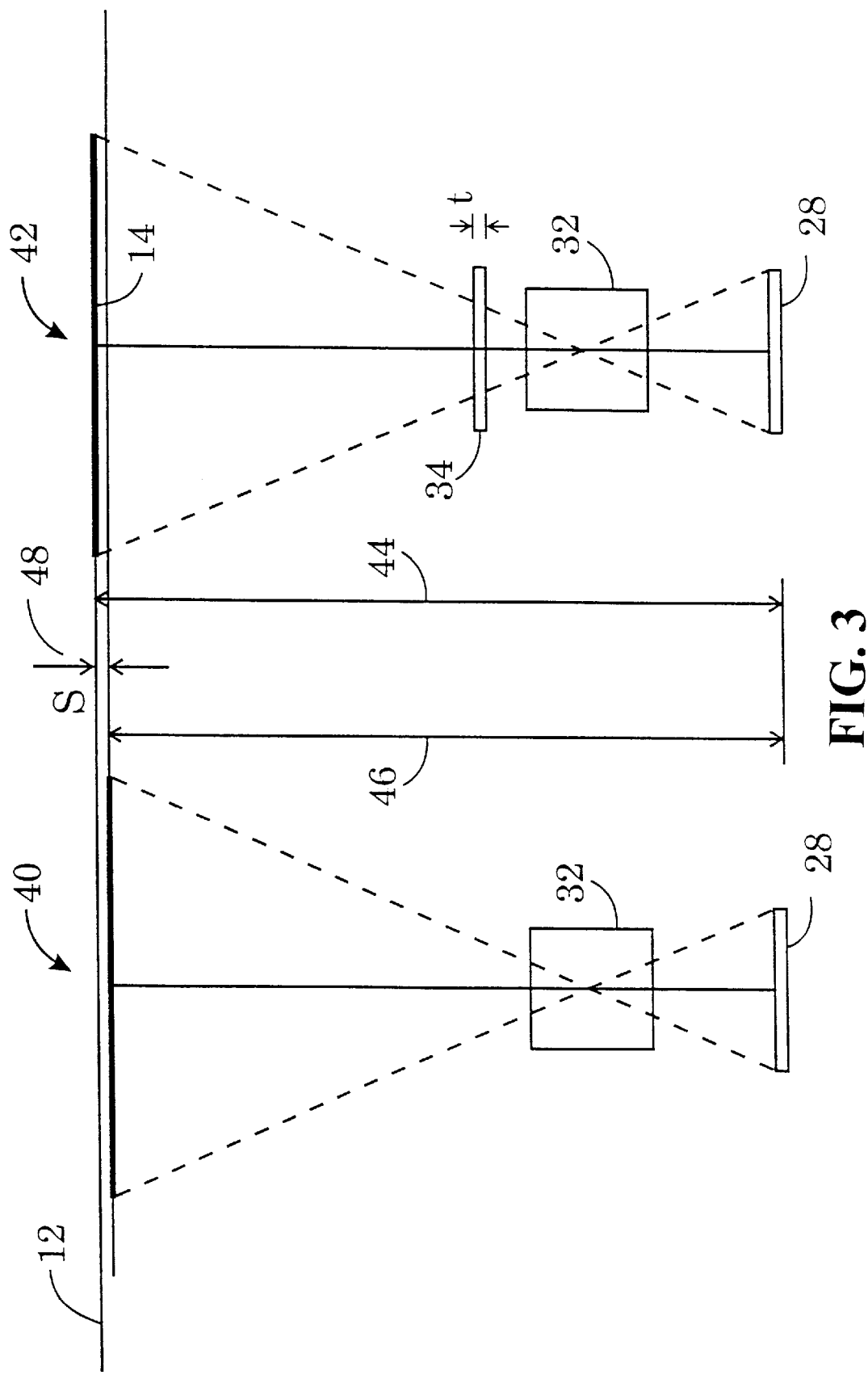
FIG. 3 is a schematic diagram of the method for calibrating the scanning module shown in FIG. 2.

Because the magnifying power of the scanner 10 is determined by the lens 32, by the light traveling distance 32 from the document 14 to the lens 32, and by the light traveling distance from the lens 32 to the optical sensing device 28, the error of the magnifying power can be calibrated by increasing or decreasing the light traveling distance between the document 14 and the lens 32. Please refer to FIG. 3. FIG. 3 is a schematic diagram of the calibration method. Index 40 indicates the light traveling distance 46 with an error in the scanning module 20, index 42 indicates the correct light traveling distance 44, and index 48 indicates the difference S between the light traveling distance 44 and the light traveling distance 46. The error of the light traveling distance 46 is the total of the tolerances of each of the components of the scanning module 20 and the errors of the position and angles of these components.

When light leaves one dielectric to another, it undergoes refraction which changes the traveling distance of the light. Therefore, placing the transparent glass 34 into the optical track of the scanning module 20 modifies the light traveling distance 46. If the transparent glass 34 increases the light traveling distance 46 a distance equal to the difference S, the total light traveling distance 46 will be the same as the traveling distance 44 which corrects the error of the light traveling distance 46.

The present invention uses the transparent glass 34 with a thickness t to calibrate the difference S. The relationship between thickness t and difference S is:

$$S = \frac{n_1 - n_a}{n_1} \times t$$

Wherein $n_1$ is the index of refraction of the transparent glass 34, $n_a$ is the index of refraction of the air.

$n_1$ and $n_a$ are constant and well known. After assembly, the total error of the light traveling distance in the scanner 10 can be measured. The thickness t of the transparent glass needed to calibrate the difference S can then be calculated using the above formula.

Figure 4:
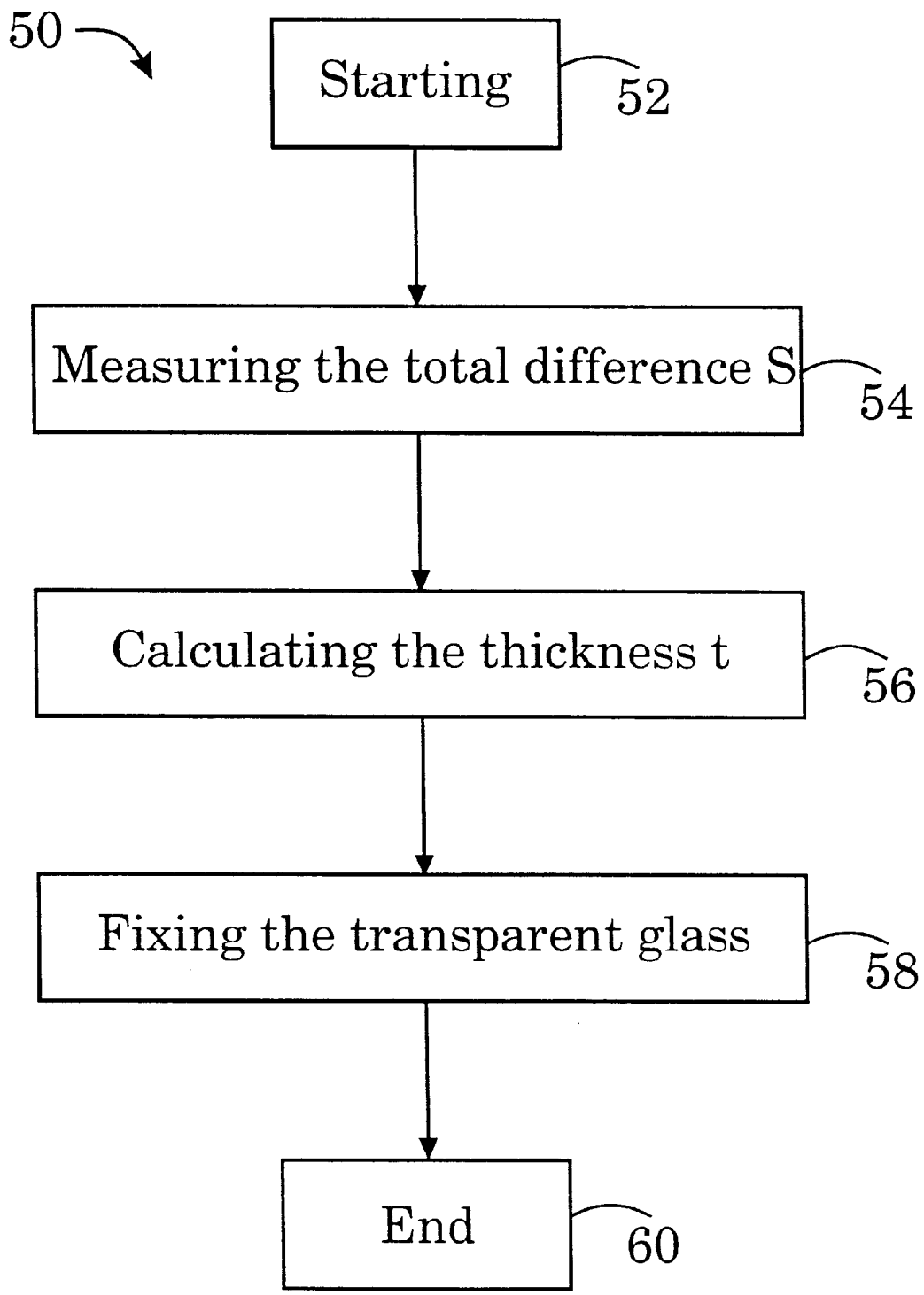
FIG. 4 is a flowchart for calibrating the scanning module according to the present invention.

Please refer to FIG. 4. FIG. 4 is a flowchart 50 for calibrating the difference of the light traveling distance of the scanner 10. It comprises the following steps:

Step 52: starting;

Step 54: measuring the total difference S in the light traveling distance of the scanner 10;

step 56: calculating the thickness t of the transparent glass 34 needed to calibrate the difference S;

step 58: fixing the transparent glass 34 onto the locking device 36;

step 60: end.

Several pieces of transparent glass over which the thickness of the transparent glass can be changed may be prepared for calibrating the difference S. Based on the difference S, the appropriate thickness transparent glass may be used. More than one transparent glass of the same thickness may also be combined to calibrate the difference S.

Although in theory any position along the optical track 38 between the document 14 and the optical sensing device 28 may be used for placing the transparent glass 34, it is still best to place the transparent glass 34 as close to the lens 32 as possible. As seen in FIG. 3, the closer the transparent glass 34 is to the lens the smaller the size needed. Conversely, the closer to the document 14, the bigger the size needed.

The optical sensing device 28 is very sensitive to its distance from the lens 32. If the transparent glass 34 is placed in the optical track between the lens 32 and the optical sensing device 28, the distance between the two components has to be adjusted to allow the lens 32 to accurately converge the light onto the optical sensing device 28. Therefore, it is preferable to place the transparent glass 34 between the scanned document 14 and the lens 32 rather than between the lens 32 and the optical sensing device 28 for light calibration.

In the above mentioned embodiment, the transparent glass 34 increases the total light traveling distance rather than decreasing it. Therefore, the distance between the lens 32 and the optical sensing device 28 may be slightly decreased during manufacturing to accommodate the increase in light traveling distance between the scanned document 14 and the lens 32 caused by the transparent glass 34.

The scanning module 20 of the present invention uses an inexpensive piece of transparent glass 34 to calibrate the unavoidable optical error which occurs during the manufacturing process. The present invention solves the technical problem of decreasing the tolerance of lenses while increasing the yield of scanners and lowering costs.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical scanning module used in an optical scanner for scanning a document comprising:

a casing having an opening for receiving light transmitted from the document;

an optical sensing device installed in the casing for transforming the light transmitted from the document into corresponding image signals;

a lens installed in the casing for converging the light transmitted from the document onto the optical sensing device; and a transparent glass module installed in the casing for altering the distance traveled by the light from the document to the optical sensing device;

wherein the thickness of the transparent glass module can be changed according to the difference between a measured light traveling distance and a standard light traveling distance of the light traveled from the document to the optical sensing device.

2. The scanning module of claim 1 further comprises a locking device installed in the casing for fixing the transparent glass module.

3. The scanning module of claim 1 wherein the transparent glass module comprises a plurality of transparent glass of the same thickness and the number of the transparent glass can be changed.

4. The scanning module of claim 1 wherein the transparent glass module comprises a piece of transparent glass over which the thickness of the transparent glass can be changed.

5. The scanning module of claim 1 further comprises a mirror module installed in the casing having a plurality of mirrors for passing the light transmitted from the document to the optical sensing device.

6. A method for calibrating the light traveling distance in an optical scanning module for scanning a document, the optical scanning module comprises:

a casing having an opening for receiving light transmitted from the document;

an optical sensing device installed in the casing for transforming the light transmitted through a predetermined optical track into corresponding image signals;

a lens module positioned in the optical track in the casing for converging the light transmitted from the document onto the optical sensing device; and a locking device installed in the optical track between the document and the lens module; wherein the method for calibrating the light traveling distance comprises the following steps:

measuring the light traveling distance from the document to the optical sensing device and comparing it with a standard light traveling distance to obtain a difference;

determining the thickness of a transparent glass module according to the difference of the light traveling distance;

fixing the transparent glass module of the determined thickness in the optical track between the document and the lens to calibrate the light traveling distance.

7. The method of claim 6 wherein the scanning module comprises a locking device installed in the casing for fixing the transparent glass module.

8. The method of claim 6 wherein the transparent glass module comprises a plurality of transparent glass of the same thickness and the number of the transparent glass can be changed.

9. The method of claim 6 wherein the transparent glass module comprises a piece of transparent glass over which the thickness of the transparent glass can be changed.

10. The method of claim 6 wherein the scanning module further comprises a mirror module installed in the casing for passing the light transmitted from the document to the optical sensing device.

* * * * *